United States Patent [19]

Carter, Sr. et al.

[11] Patent Number: 4,626,171
[45] Date of Patent: Dec. 2, 1986

[54] ROTOR BLADE CONSTRUCTION FOR CIRCULATION CONTROL AIRCRAFT

[75] Inventors: Donald R. Carter, Sr., Derby; Timothy A. Krauss, Harwinton; Matthew Sedlak, Wallingford, all of Conn.

[73] Assignee: United Technologies Corporation, Hartford, Conn.

[21] Appl. No.: 664,738

[22] Filed: Oct. 25, 1984

[51] Int. Cl.⁴ .............................................. B64C 21/08
[52] U.S. Cl. .................................. 416/90 A; 416/20 R
[58] Field of Search ................ 416/90 A, 20 R, 20 A, 416/90 R; 244/207

[56] References Cited

U.S. PATENT DOCUMENTS

| | | | |
|---|---|---|---|
| 3,139,936 | 7/1964 | Davidson et al. | 416/20 R |
| 3,172,620 | 3/1965 | Darby | 416/20 R X |
| 3,524,711 | 8/1970 | Cheeseman et al. | 416/20 R |
| 3,554,664 | 1/1971 | Cheeseman et al. | 416/20 R X |
| 3,873,233 | 3/1975 | Linck | 416/20 R X |
| 4,137,008 | 1/1979 | Grant et al. | 416/90 A X |
| 4,463,920 | 8/1984 | Nichols et al. | 416/90 A X |

*Primary Examiner*—Everette A. Powell, Jr.
*Attorney, Agent, or Firm*—Russell M. Lipes, Jr.

[57] ABSTRACT

A circulation control aircraft rotor blade having a spanwise Coanda surface 16 and a plurality of spanwise extending flexible composite material panels 18 cooperating with the surface to define slots for the discharge of compressed air from within the blade with each panel having first flexure means 60 associated with screw adjustments 36 for establishing a slot opening preload and second flexure means 62 associated with screw adjustments 38 for establishing a slot maximum opening.

2 Claims, 4 Drawing Figures

ROTOR BLADE CONSTRUCTION FOR CIRCULATION CONTROL AIRCRAFT

The Government has rights in this invention pursuant to NASA Contract No. NAS2-11771.

DESCRIPTION

1. Technical Field

This invention relates to a rotor blade for an aircraft utilizing a circulation control rotor system and more particularly to a spanwise air passage slot construction for the blade.

2. Background Art

An X-wing aircraft is a rotary wing aircraft that uses a rigid rotor/wing utilizing circulation control airfoils. The rotor is driven mechanically and the rotor blades operate essentially in fixed pitch. The rotor may rotate, as in a helicopter, or it may be stopped and positioned so as to act like a fixed wing. Collective and cyclic control is achieved by control of air circulation about a Coanda surface on the blade airfoils. This is done by blowing compressed air through leading edge and trailing edge ducts in the rotor blades and modulating the amount of air being ejected through spanwise slots on the leading and trailing edges of the rotor blades.

The rotor system for an X-wing aircraft includes a hub and attached rotor blades and a pneumatic system for delivering pressurized air separately to the leading edge and the trailing edge of the individual rotor blades at a desired pressure and mass flow. The pneumatic system includes a compressor, a stationary air supply chamber, valving for controlling the flow of air from the chamber to the blades, and a rotating air distribution arrangement for conducting air separately to the leading edge and trailing edge of the blades.

In circulation control airfoils, pressurized air is ejected from spanwise openings or slots along the upper side of the rounded airfoil leading/trailing edge Coanda surface. The airflow from the slots attaches to the rounded leading/trailing edge which increases the circulation to provide a corresponding lift increase over an airfoil having no ejected air. For a given blade internal pressure and aerodynamic condition, the lift change due to circulation control is proportional to the area of the slot opening up to a certain limit. When the slot opening exceeds this limit no additional lift is achieved, a condition analogous to stall in a conventional airfoil. Since an X-wing circulation control airfoil is symmetrical about its half chord, the leading edge on the advancing side of the blade path disc becomes the trailing edge on the retreating side, and vice-versa. To maximize performance as the rotor slows down, it is desirable that the "local" leading edge slot be closed at all azimuth positions. The use of conventional preload springs for closing the slot is not desirable primarily because of the weight which would be involved.

A circulation control rotor system is described in the report titled "Circulation Control Rotor Flight Demonstrator" by David R. Barnes, Douglas G. Kirkpatrick and George A. McCoubrey presented at an American Helicopter Society Mideast Region Symposium in August, 1976. The report titled "Status Report on Advanced Development Program Utilizing Circulation Control Rotor Technology" by Kenneth R. Reader, Douglas G. Kirkpatrick and Robert M. Williams, Paper No. 44 presented at the Fourth European Rotorcraft and Powered Lift Aircraft Forum, Stresa, Italy, Sept. 13–15, 1978 describes an X-wing development program.

DISCLOSURE OF INVENTION

An object of the present invention is to provide an improved construction of spanwise air passage slot openings in the rotor blade of a circulation control aircraft.

Another object of the invention is to provide a circulation control rotor blade having spanwise slot openings the size of which can be externally adjusted and for which there is opening defining structure having independently adjustable preload and travel.

Still another object of the invention is the provision of a circulation control rotor blade having adjustable spanwise slot openings defined by structure which does not use springs for operation and which is readily replaceable.

A further object of the invention is the provision of a circulation control rotor blade having adjustable spanwise slot openings defined by structure which is of composite material and which has double flexure portions for preload and maximum slot opening adjustment and which is forgiving of tolerance variations between rotor blades.

The foregoing and other objects, features and advantages will be apparent from the specification and claims and from the accompanying drawings which illustrate an embodiment of the invention.

BEST MODE FOR CARRYING OUT THE INVENTION

Figure 1:
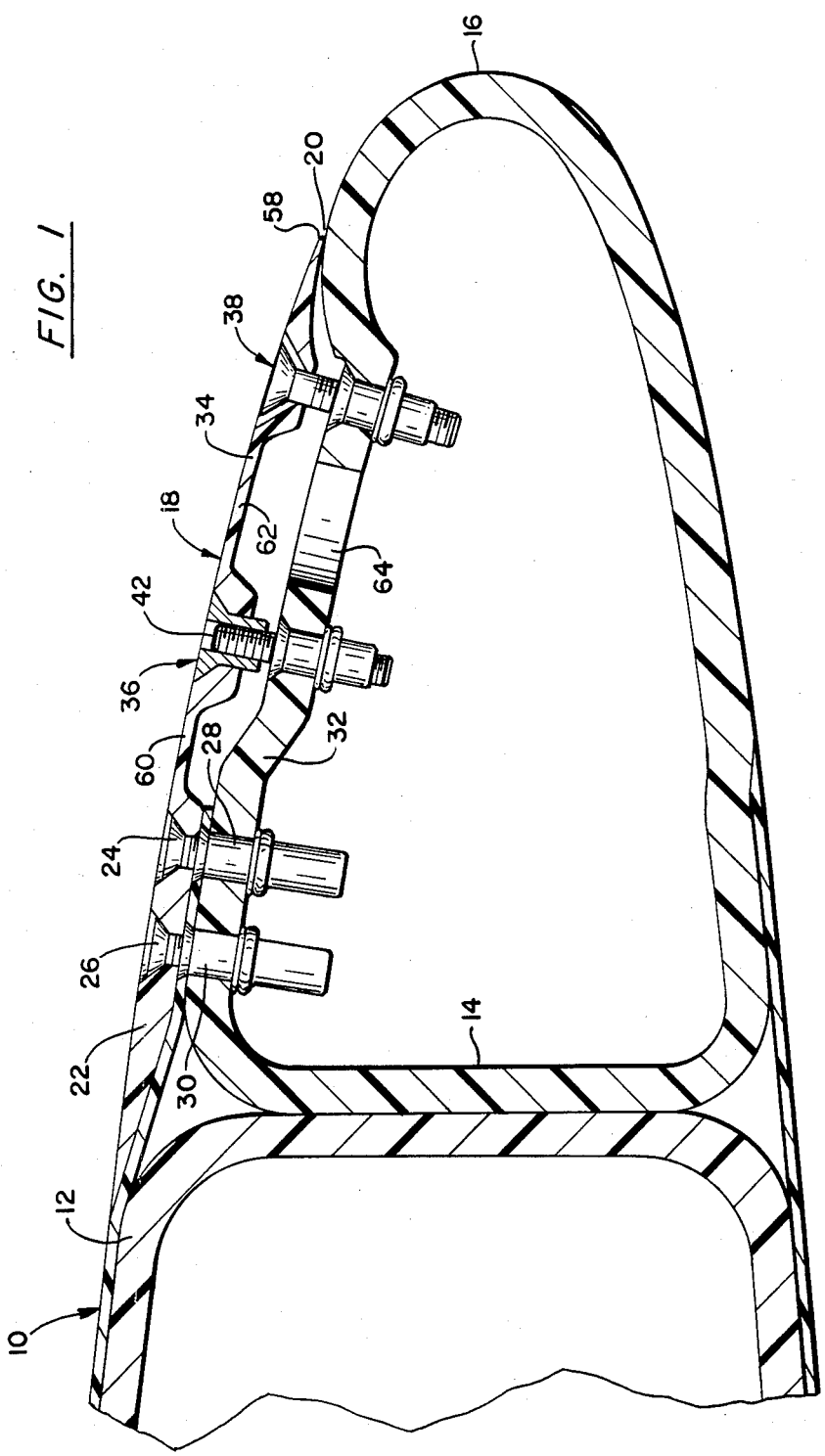
FIG. 1 is a sectional view through a rotor blade constructed in accordance with the invention showing a closed slot condition.

In the rotor blade construction shown in FIG. 1 blade 10 is of composite construction and includes spar section 12 and compressed air duct 14, the spar section and duct being bonded integrally together. The edge of the blade, the leading edge and usually also the trailing edge, is defined by Coanda surface 16. This surface may be either a portion of the compressed air duct as shown or it may be a separate element. Flexible panel 18 extends spanwise along the upper surface of the blade and through cooperation with the upper surface of the Coanda defines slot 20 through which compressed air may be discharged from duct 14.

Flexible panel 18 is attached to the upper surface of the blade at a plurality of spaced stations along the blade span, or a section of the blade span. In FIG. 1, rearward portion 22 of the panel is secured by two similar screws 24 and 26 threaded into fasteners 28 and 30, respectively, which are fixed in position on upper surface 32 of duct 14. Forward portion 34 of panel 18 also is connected to the upper portion of duct 14, but these connections permit and control bending of the panel under the influence of compressed air within duct 14. Screw connection 36, a differential thread screw, permits establishment of the loading of the forward portion of the panel against the Coanda surface. Screw connection 38 permits establishment of a limit to movement of the forward portion away from the surface (open slot) in response to air pressure and thus a limitation of the maximum opening of slot 20.

Figure 2:
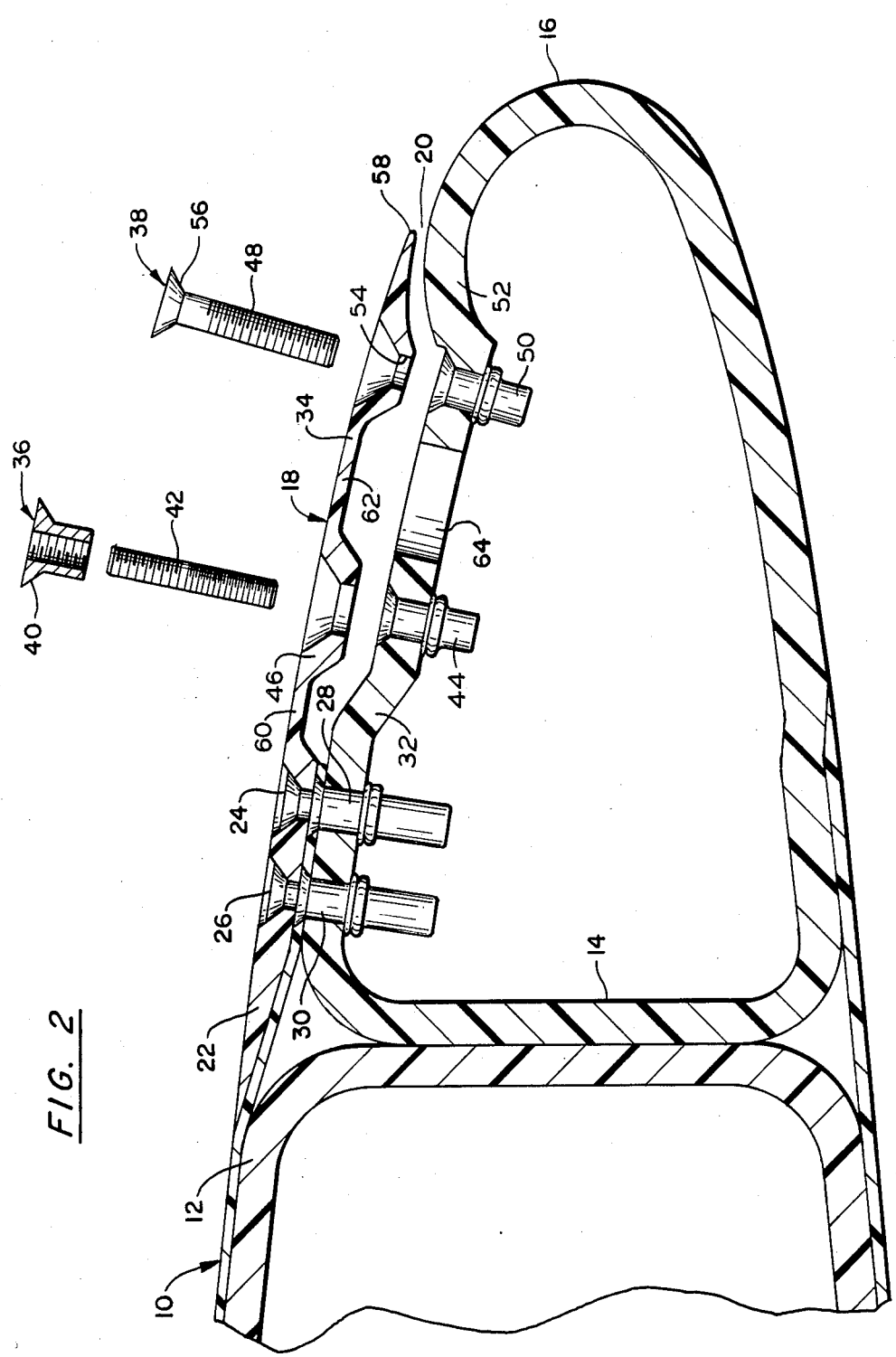
FIG. 2 is a similar sectional view showing an exploded view of the adjustment screws and an open slot condition.

FIG. 2 shows the nature of screw connections 36 and 38 in more detail with the slot being fully open. Screw connection 36 consists of preload adjustment nut 40, differential thread adjustment stud 42 and fastener 44. Each end of adjustment stud 42 is threaded, with both ends being threaded in the same direction, and the thread of the upper end which mates with threads in nut 40 is of a different pitch than that of the thread of the lower end which mates with fastener 44. Nut 40 is affixed to midportion 46 of flexible panel 18 and fastener 44 is affixed to air duct upper surface 32. By virtue of the differential threads on adjustment stud 42, relatively fine control of preload on flexible panel 18 is provided.

Screw connection 38 consists of limit adjustment screw 48 and fastener 50 which is affixed to surface 52 of the air duct. The limit adjustment screw fits loosely within countersunk hole 54 near the outer edge of flexible panel 18, and flared head 56 on screw 48 is adapted to contact the countersunk portion of hole 54. The relative axial position of limit adjustment screw 48 limits movement of panel outer edge 58 away from Coanda surface 16. The location of screw 48 with respect to slot 20 must be sufficiently back from the slot so that it does not interfere with airflow through the slot opening.

In assembly of the flexible panel on the blade structure, the panel, which is of composite material, is fastened in position by screws 24 and 26. Stud 42 is adjusted so that slot 20 is closed due to the position of panel edge 58 and the design preload on the panel is established. After edge 58 contacts surface 16, further adjustment of stud 42 to move panel 18 inward results in flexure of the panel along area 60 between the stud and attachment screw 24. The thickness and elastic properties of this panel area through layup of the composite structure are specifically designed to afford the desired flexing characteristics. Preload is established by pressurizing duct 14 and adjusting stud 42 so that slot 20 remains closed until the desired minimum operational pressure is reached.

After preload has been established, the axial position of limit adjustment screw 48 is set so as to establish the maximum opening of slot 20. This is done by increasing the pressure in duct 14 beyond the minimum operational pressure to the desired maximum operational pressure. The increase in pressure will cause the portion of panel 18 toward the edge of the blade to flex away from Coanda surface 16, the panel flexing along area 62 between adjusting screws 36 and 38. The thickness and elastic properties of this panel area are designed similarly to area 60 to afford the desired but different flexing characteristics. Adjustment screw 38 is set at the flexed position of edge 58 when duct air pressure is at its maximum operating pressure.

During operation, air at variable pressure is delivered to duct 14 at the root end of the blade and then passes through duct holes, such as hole 64 in FIGS. 1 and 2, to slot 20. Because of the preload on panel 18 as established by differential thread screw connection 36, slot 20 is closed until the pressure of the air in duct 14 reaches the minimum operating pressure. As the air pressure exceeds that value, edge 58 moves away from Coanda surface 16. Compressed air then will begin to flow from the duct over the Coanda surface. As the pressure of the air increases, edge 58 will continue to move away from the Coanda surface until, at the maximum operating pressure, contact is made with flared head 56 on screw connection 38. A greater air pressure will not increase the opening of slot 20.

Figure 3:
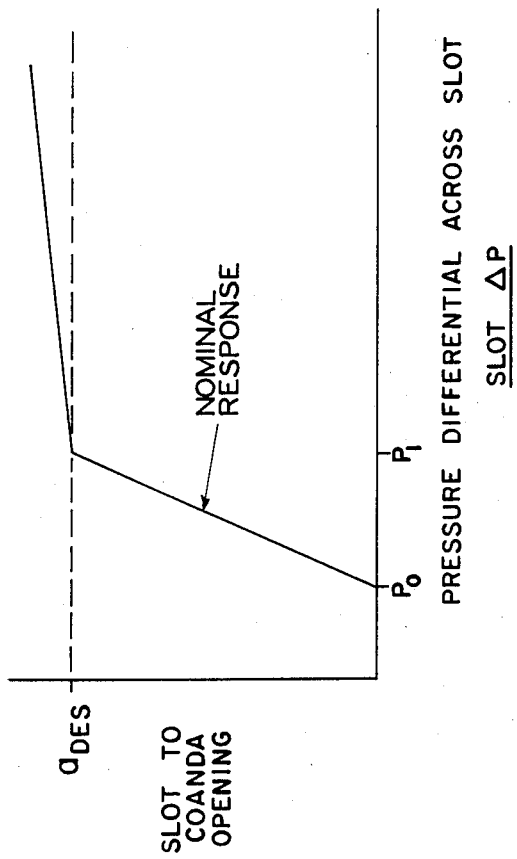
FIG. 3 is a graph showing a plot of slot opening versus slot differential opening.

The actual operation of the slot is shown in the plot of FIG. 3 where $a_{DES}$ is the desired maximum slot opening, $P_0$ is the preload pressure setting, and $P_1$ is the pressure at which maximum opening occurs. The small increase in slot opening shown in the plot as pressures increase above $P_1$ reflects the slight bending of panel 18 which occurs at edge 58 outward from screw connection 38. The slope of the plot between points $P_0$ and $P_1$ is defined in accordance with performance requirements and is related to and may be varied by the flexure characteristics of panel area 62.

Figure 4:
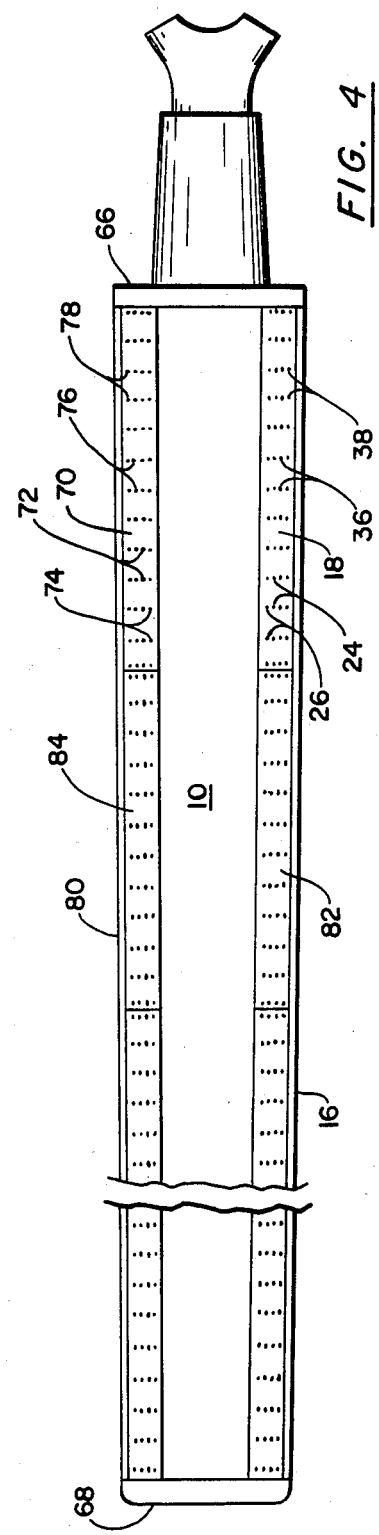
FIG. 4 is a plan view of a portion of a rotor blade constructed in accordance with the invention.

In the plan view of FIG. 4, which shows a rotor blade constructed in accordance with the invention, blade 10 having root 66 and tip 68 has flexible panels 18 and 70 at its leading and trailing edges respectively. Panel 18 is secured to the blade structure by parallel rows of screws 24 and 26 inboard from the blade leading edge and panel 70 is secured to the blade by parallel rows of screws 72 and 74 inboard from the blade trailing edge. A row of screw connections 36 along a midportion of panel 18 provides for the establishment of slot preload at stations along the panel length, and similarly a row of screw connections 76 along a midportion of panel 70 provides for the establishment of slot preload at stations along that panel length. Screw connections 38 along the outer edge of panel 18 permit the adjustment of the maximum opening of the slot between the panel and leading edge Coanda surface 16 and screw connections 78 along the outer edge of panel 70 permit the adjustment of the maximum opening of the slot between the panel and trailing edge Coanda surface 80. Panel 18 and panel 70 as shown do not necessarily extend the full length of the blade span. There may be a number of additional panels along the span such as panel 82 adjacent panel 18 and panel 84 adjacent panel 70. A principal reason for a multi-panel construction is to afford easy replaceability of panel sections in the event of wear or damage. The spanwise distance between adjacent screws is related to their effect on airflow through the slot as well as the compressed air loading on the panels. It should be understood that the invention is not limited to the particular embodiment shown and described herein, but that various changes and modifications may be made without departing from the spirit or scope of this concept as defined by the following claims.

We claim:

1. A rotor blade for a circulation control aircraft having along a portion of its span an edge section consisting of a Coanda surface, a duct located within said edge section for providing compressed air to be discharged adjacent the top of the Coanda surface to flow around the outside of the Coanda surface, and flexible panel means for controlling compressed air discharge, said panel having a first edge fixedly connected to the upper outside surface of said edge section and a second edge defining with an upper portion of the Coanda surface a spanwise extending slot through which compressed air is discharged, said panel also having first flexure means associated with first means for establishing a preload on said panel second edge so that said slot is closed until a minium duct air pressure is reached, and second flexure means associated with second means for limiting the movement of said panel second edge in response to duct air pressure so as to establish a maximum slot opening, said first flexure means including a composite panel length area of specific thickness and layup to provide desired flexing characteristics and said second flexure means including a composite panel length area of different specific thickness and layup to provide different flexing characteristics than said first flexure means.

2. A rotor blade for a circulation control aircraft having along a portion of its span an edge section consisting of a Coanda surface, a duct located within said edge section for providing compressed air to be discharged adjacent the top of the Coanda surface to flow around the outside of the Coanda surface, and flexible panel means for controlling compressed air discharge, said panel having a first spanwise edge portion fixedly connected to the upper outside surface of said blade edge section, a second spanwise edge portion defining with an upper portion of the Coanda surface a spanwise extending slot through which compressed air may be discharged, and a mid-spanwise portion between said panel first and second spanwise edges, first adjustment means associated with said mid-spanwise portion for establishing a preload on said panel second spanwise edge portion so that said slot may be closed until a minimum duct air pressure is reached and second adjustment means associated with said second spanwise edge portion for establishing a maximum slot opening, the elastic properties of the panel between said fixedly connected edge portion and said mid-spanwise portion being different than the elastic properties of the panel between said mid-spanwise portion and said second spanwise edge portion.

* * * * *